J. N. PERKINS.
BEARING FOR INDICATOR SHAFTS.
APPLICATION FILED APR. 14, 1911.
996,518.
Patented June 27, 1911.
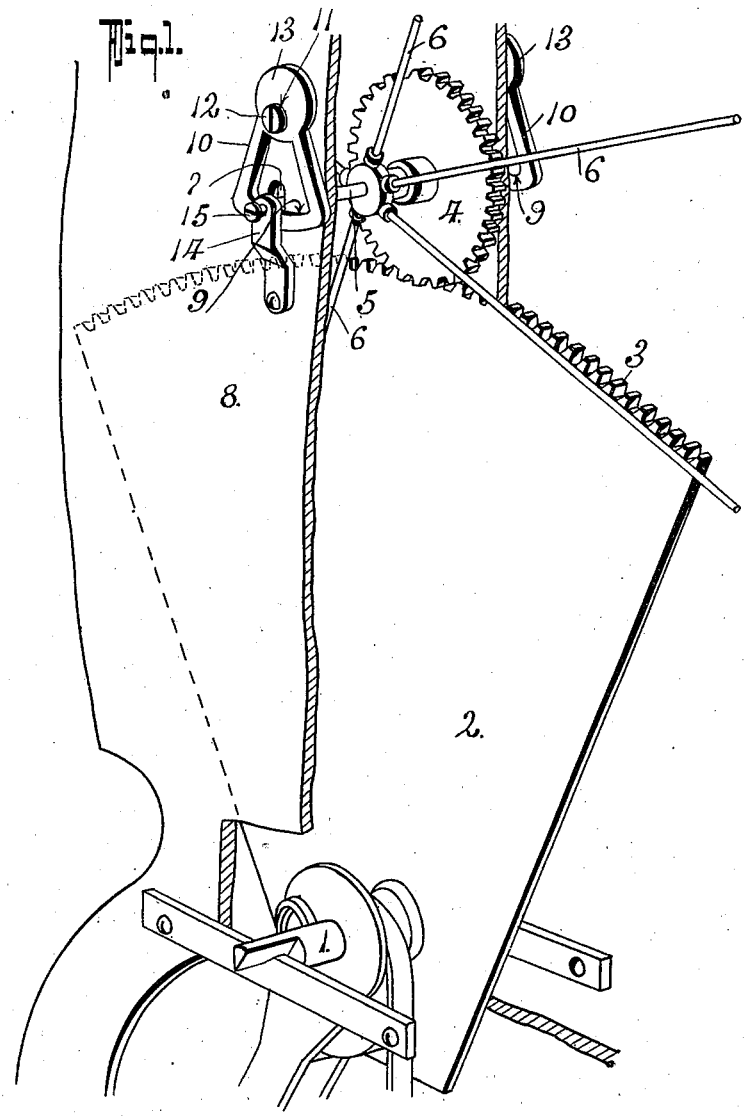
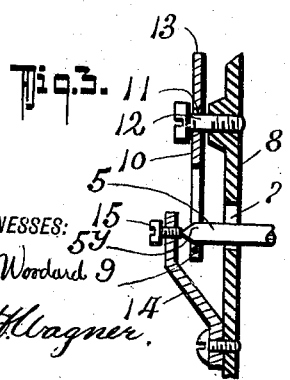
WITNESSES:
Hayward Woodard
Charles H. Wagner
INVENTOR
John N. Perkins
BY
Fred J. Dieterich
ATTORNEYS

UNITED STATES PATENT OFFICE.

JOHN NICHOLAS PERKINS, OF RICHMOND, VIRGINIA, ASSIGNOR TO THE RICHMOND SCALE CO., INCORPORATED, OF RICHMOND, VIRGINIA.

BEARING FOR INDICATOR-SHAFTS.

996,518. Specification of Letters Patent. Patented June 27, 1911.

Original application filed February 13, 1911, Serial No. 608,253. Divided and this application filed April 14, 1911. Serial No. 621,083.

*To all whom it may concern:*

Be it known that I, JOHN N. PERKINS, residing in Richmond, in the county of Henrico and State of Virginia, have invented a new and Improved Bearing for Indicator-Shafts, of which the following is a specification.

My invention relates to certain new and useful improvements in bearings and it is more particularly designed for use as a bearing in connection with automatic computing scales and the like in which the scale or dial is carried by a rotatable shaft. The rotatable shaft in scales of this type is usually driven by a pull cable and counterweight. I have, however, designed a scale of this type in which the shaft is turned by a sector meshing with a pinion on the shaft. In a scale of this character considerable lateral thrust is provided. It is to provide a bearing that is especially adapted for this construction of scale that my present invention has been devised.

This invention consists essentially in providing two rigid supports having vertical slots or openings of greater area than the cross sectional area of the shaft, through which supports the bearing ends of the shaft, that carries the indicator dial project. The bearing ends of the shaft rest on the stirrups which are swung from suitable pivots and each has that surface which contacts the shaft, curved on an arc whose center is the pivot bearing of the stirrup, the length of the stirrup bearing surface being in excess of the circumference of the bearing portion of the shaft, and furthermore a device is provided for engaging the ends of the shaft in an anti-friction way to prevent end-wise movement of the indicator shaft.

The present application is a divisional part of my co-pending application, filed February 13, 1911, Serial #608,253.

In its more subordinate nature, the invention includes those novel features of construction, combination and arrangement of parts, all of which will be first fully described, then be specifically pointed out in the appended claims and illustrated in the accompanying drawings, in which:—

Figure 1, is a perspective view of a part of a scale embodying the invention. Fig. 2 is a vertical cross section of the invention. Fig. 3 is a view similar to Fig. 2 of a slight modification.

In the drawings in which like numerals and letters of reference indicate like parts in all of the figures, 1 is the shaft of the differential balancing mechanism of a scale, on which shaft the gear sector 2 is mounted. The sector 2 has its gear face 3 designed to mesh with the pinion 4 of the indicator chart shaft 5. The chart carrier 6 is mounted on the shaft 5, which shaft in practice is designed to make one complete revolution from the zero to the maximum indicator of the chart (not shown) the shaft 5 projects through an opening 7 in each of the standards 8 and rests on the bearing surfaces 9 of the stirrups 10, one of which is at each end of the shaft. The stirrups 10 have bearing portions 11 to rest on the pivot 12 which in the preferred form of the present invention is screwed into the standard 8. The sectors 10 may be counterweighted as at 13, and in order to prevent endwise movement of the shaft 5, a bracket 14 is secured to each standard 8 to project into alinement with the shaft end to be engaged thereby and thus limit the longitudinal movement of the shaft. If found desirable, a screw 15 having a rounded or pointed end (Fig. 2) may be carried by each bracket 14 to engage the respective end of the shaft 5, or the screw end may be blunt and engage a pointer or rounded end $5^y$ (Fig. 3) of the shaft. It will be observed in practice the sector 10 is pivoted to move in a plane between the screw carrying end of the bracket 4 and standard 8, and not lie in contact with either, so as to reduce the friction as much as possible.

When the scale is at rest it will be seen the bearing 12 of the stirrup 10 is directly over the center of the shaft end $5^y$. Now when an article to be weighed is put on the scale pan (not shown) a gear sector 2 is turned in the direction of the arrow in Fig. 1, thus turning the pinion (Fig. 4) in the direction of the arrow in 1, which imparts a lateral thrust from left to right in Fig. 1, and thereby tends to move the shaft 5 bodily, laterally. This movement is limited by contact between the ends of the shaft 5 and the walls of the openings 7. As soon, however, as the movement of the pinion 4 has been started, the lateral thrust will reduce, gradually becoming *nil*, thereby permitting the shaft 5 to again become centralized and lie directly beneath the pivot 12, with its ends out of contact with the walls of the openings 7. As the sector 2 reaches the limit of its movements and vibration ceases, the shaft ends 5 will rest in the openings 7 on the stirrups 10 and out of contact with the walls of the openings 7.

It will be observed that by my construction of bearing extreme sensitiveness is obtained at the particular time at which it becomes most necessary, namely, at the time the scale with its goods arrives at its weight indicating position and the sector 2 oscillates or vibrates from side to side, coming to a rest at the proper indication.

From the foregoing taken in connection with the accompanying drawings, the complete construction, arrangement and advantages of my invention will be readily apparent.

What I claim is:—

1. A rotatable shaft, a pair of supports having holes through which the ends of said shaft project, stirrups pivotally mounted on the outside of said supports and in which the projecting ends of said shaft rest, bracket members secured to said supports and projecting up into alinement with the ends of said shaft, said stirrups being located in planes between said supports and the ends of the adjacent brackets.

2. A rotatable shaft, a pair of supports having holes through which the ends of said shaft project, stirrups pivotally mounted on the outside of said supports and in which the projecting ends of said shaft rest, bracket members secured to said supports and projecting up into alinement with the ends of said shaft, said stirrups being located in planes between said supports and the ends of the adjacent brackets, and set screws in said brackets to engage the ends of said shaft at a single point of contact.

JOHN NICHOLAS PERKINS.

Witnesses:
J. C. KENT,
ROBT. N. POLLARD.